United States Patent
Washio et al.

(10) Patent No.: US 10,682,910 B2
(45) Date of Patent: Jun. 16, 2020

(54) CONTROL APPARATUS FOR VEHICLE

(71) Applicant: TOYOTA JIDOSHA KABUSHIKI KAISHA, Toyota-shi, Aichi-ken (JP)

(72) Inventors: Taichi Washio, Okazaki (JP); Munenori Terada, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/292,797

(22) Filed: Mar. 5, 2019

(65) Prior Publication Data
US 2019/0270381 A1    Sep. 5, 2019

(30) Foreign Application Priority Data
Mar. 5, 2018  (JP) ................. 2018-039150

(51) Int. Cl.
| F16H 61/12 | (2010.01) |
| B60K 23/08 | (2006.01) |
| B60K 17/35 | (2006.01) |
| B60K 17/06 | (2006.01) |
| B60K 17/04 | (2006.01) |

(52) U.S. Cl.
CPC .......... B60K 23/0808 (2013.01); B60K 17/04 (2013.01); B60K 17/06 (2013.01); B60K 17/35 (2013.01); *B60W 2510/0604* (2013.01); *B60W 2520/28* (2013.01); *B60Y 2400/72* (2013.01)

(58) Field of Classification Search
None
See application file for complete search history.

(56) References Cited

U.S. PATENT DOCUMENTS

| 2004/0092343 A1* | 5/2004 | Sawada ............... F16H 1/66272 474/18 |
| 2007/0060441 A1 | 3/2007 | Kim et al. |
| 2016/0258531 A1* | 9/2016 | Ito ........................ F16H 9/18 |
| 2018/0080549 A1* | 3/2018 | Ozono ............... F16H 61/0021 |
| 2018/0259066 A1* | 9/2018 | Sudo ....................... F16H 59/42 |
| 2018/0283541 A1* | 10/2018 | Sudo ....................... F16H 59/40 |

FOREIGN PATENT DOCUMENTS

| JP | H06-213316 A | 8/1994 |
| JP | 2007-071301 A | 3/2007 |
| JP | 2013-072516 A | 4/2013 |
| JP | 2013-087923 A | 5/2013 |

\* cited by examiner

*Primary Examiner* — Justin Holmes
(74) *Attorney, Agent, or Firm* — Oliff PLC

(57) ABSTRACT

A control apparatus for a vehicle including an engine, drive wheels, a drive-force transmitting apparatus, a hydraulic pressure sensor and a pump. The control apparatus makes a determination as to whether a failure occurs in the hydraulic pressure sensor, based on a detected value of a pulley hydraulic pressure by which a primary pulley or a secondary pulley of a continuously-variable transmission mechanism of the drive-force transmitting apparatus is to be operated. The control apparatus makes the determination until a given length of time elapses from a point of time at which the hydraulic pressure sensor becomes ready to detect the pulley hydraulic pressure after initiation of supply of an electric power to at least the hydraulic pressure sensor in an operation stopped state of the engine. The control apparatus does not make the determination after the given length of time elapses from the above-described point of time.

6 Claims, 4 Drawing Sheets

CONTROL APPARATUS FOR VEHICLE

This application claims priority from Japanese Patent Application No. 2018-039150 filed on Mar. 5, 2018, the disclosure of which is herein incorporated by reference in its entirety.

FIELD OF THE INVENTION

The present invention relates to a control apparatus for a vehicle having continuously-variable transmission mechanism that is provided in a drive-force transmitting path between an engine and drive wheels of the vehicle.

BACKGROUND OF THE INVENTION

There is known a control apparatus for a vehicle having an engine, a continuously-variable transmission mechanism including a primary pulley, a secondary pulley and a transfer element looped over the primary and secondary pulleys, a hydraulic pressure sensor configured to detect a pulley hydraulic pressure by which the primary pulley or secondary pulley is to be operated, and a pump that is to be driven by rotation of the engine so as to supply a source pressure of the pulley hydraulic pressure. As an example of such a control apparatus, JP-2013-87923A discloses a hydraulic control apparatus for a belt-type continuously-variable transmission provided in a vehicle having a hydraulic pressure sensor configured to detect a secondary pressure as the pulley hydraulic pressure by which the secondary pulley is to be operated. This Japanese Patent Application Publication discloses an arrangement in which it is determined that a failure occurs in the hydraulic pressure sensor when a detected value of the secondary pressure detected by the hydraulic pressure sensor becomes higher than a target value of the secondary pressure by at least a given pressure value.

SUMMARY OF THE INVENTION

By the way, during increase of a rotational speed of the engine in process of start of the engine, a supply of a working fluid from the pump could become unstable, so that there is a case in which an actually outputted value of the pulley hydraulic pressure is made excessively higher than a command value of the pulley hydraulic pressure. In such a case, there is a risk that it could be erroneously determined that a failure occurs in the hydraulic pressure sensor. If it is determined that a failure occurs in the hydraulic pressure sensor, for example, a control operation using the hydraulic pressure sensor cannot be executed, thereby requiring another control operation to be executed in the event of the failure of the hydraulic pressure sensor. Thus, such an erroneous determination could cause reduction of a drivability of the vehicle.

The present invention was made in view of the background art described above. It is therefore an object of the present invention to provide a control apparatus for a vehicle, which is capable of preventing an erroneous determination of a failure of the hydraulic pressure sensor and appropriately determining the occurrence of a failure of the hydraulic pressure sensor such as a so-called "high-side failure" of the hydraulic pressure sensor.

The object indicated above is achieved according to the following aspects of the present invention.

According to a first aspect of the invention, there is provided a control apparatus for a vehicle that includes an engine, drive wheels, a drive-force transmitting apparatus, a hydraulic pressure sensor and a pump. The drive-force transmitting apparatus is configured to transmit a drive force of the engine toward the drive wheels, and includes a continuously-variable transmission mechanism including a primary pulley, a secondary pulley and a transfer element looped over the primary and secondary pulleys. The hydraulic pressure sensor is configured to detect a pulley hydraulic pressure by which the primary pulley or the secondary pulley is to be operated. The pump is to be driven by rotation of the engine so as to supply the pulley hydraulic pressure. The control apparatus includes a failure determining portion configured to make a determination as to whether a failure occurs in the hydraulic pressure sensor, based on a detected value of the pulley hydraulic pressure detected by the hydraulic pressure sensor. The failure determining portion is configured to make the determination until a given length of time elapses from a point of time at which the hydraulic pressure sensor becomes ready to detect the pulley hydraulic pressure after initiation of supply of an electric power to at least the hydraulic pressure sensor in an operation stopped state of the engine. The failure determining portion is configured to not make the determination after the given length of time elapses from the point of time. It is noted that the above-described given length of time may be shorter than a length of time from the point of time until the engine is started, for example, so that the failure determining portion is configured to stop making the determination before the engine is started and to not make the determination after the engine is started.

According to a second aspect of the invention, in the control apparatus according to the first aspect of the invention, the failure determining portion is configured to determine that the failure occurs in the hydraulic pressure sensor when all of three conditions are kept satisfied for at least a second given length of time, wherein the three conditions consist of a first condition that the detected value of the pulley hydraulic pressure is higher than a given pressure value, a second condition that the detected value of the pulley hydraulic pressure is higher than a command value of the pulley hydraulic pressure by a value larger than a given pressure value difference, and a third condition that only a length of time that is not larger than the given length of time as a first given length of time has elapsed from the point of time.

According to a third aspect of the invention, in the control apparatus according to the first or second aspect of the invention, the supply of the electric power to at least the hydraulic pressure sensor is initiated in the operation stopped state of the engine, by turning on an ignition switch of the vehicle whereby the engine becomes ready to be started in response to the ignition switch turned on, wherein the given length of time is not larger than a length of time, from the point of time, until a point of time at which the pulley hydraulic pressure is increased, as a result of increase of a rotational speed of the engine in process of start of the engine, substantially to a given pressure value that is used to determine whether the failure occurs in the hydraulic pressure sensor.

According to a fourth aspect of the invention, in the control apparatus according to any one of the first through third aspects of the invention, there is further provided a state determining portion configured to determine whether the hydraulic pressure sensor has become ready to detect the pulley hydraulic pressure, wherein the state determining portion determines that the hydraulic pressure sensor has become ready to detect the pulley hydraulic pressure, when at least a third given length of time elapses from a point of time at which the supply of the electric power to at least the hydraulic pressure sensor is initiated.

According to a fifth aspect of the invention, in the control apparatus according to any one of the first through fourth aspects of the invention, the drive-force transmitting apparatus further includes: an input rotary member to which the drive force is to be transmitted from the engine; an output rotary member from which the drive force is to be outputted to the drive wheels; a gear mechanism configured to provide at least one gear ratio; a first engagement device; and a second engagement device, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism when the first drive-force transmitting path is established by engagement of the first engagement device, and wherein the plurality of drive-force transmitting paths include a second drive-force transmitting path through which the drive force is to be transmitted by the continuously-variable transmission mechanism when the second drive-force transmitting path is established by engagement of the second engagement device.

In the control apparatus according to the first aspect of the invention, it is determined whether a failure occurs in the hydraulic pressure sensor, based on the detected value of the pulley hydraulic pressure, until the given length of time elapses from the point of time at which the hydraulic pressure sensor becomes ready to detect the pulley hydraulic pressure after the initiation of the supply of the electric power to at least the hydraulic pressure sensor in the operation stopped state of the engine. Thus, the determination regarding the failure of the hydraulic pressure sensor is made at a stage before an excessive increase of the pulley hydraulic pressure which could happen in process of start of the engine, for example, when the engine is started upon the initiation of the supply of the electric power to at least the hydraulic pressure sensor. Owing to this arrangement, it is possible to detect or determine the occurrence of a failure of the hydraulic pressure sensor such as a so-called "high-side failure" which is caused by, for example, a short circuit and which increases the detected value of the pulley hydraulic pressure to a maximum value. On the other hand, it is not determined whether a failure occurs in the hydraulic pressure sensor, after the given length of time elapses from the point of time at which the hydraulic pressure sensor becomes ready to detect the pulley hydraulic pressure. Thus, when an excessive increase of the pulley hydraulic pressure happens in process of start of the engine, it is not erroneously determined that a failure occurs in the hydraulic pressure sensor. Therefore, it is possible to prevent an erroneous determination of a failure of the hydraulic pressure sensor and appropriately determine the occurrence of the "high-side failure" of the hydraulic pressure sensor.

In the control apparatus according to the second aspect of the invention, it is determined that the failure occurs in the hydraulic pressure sensor when all of the above-described three conditions are kept satisfied for at least the second given length of time, so that the failure of the hydraulic pressure sensor such as the above-described "high-side failure" is appropriately detected or determined.

In the control apparatus according to the third aspect of the invention, the supply of the electric power to at least the hydraulic pressure sensor is initiated in the operation stopped state of the engine, by turning on the ignition switch of the vehicle, and the above-described given length of time is not larger than a length of time, from the point of time at which the hydraulic pressure sensor becomes ready to detect the pulley hydraulic pressure, until the point of time at which the pulley hydraulic pressure is increased substantially to the given pressure value as a result of increase of a rotational speed of the engine in process of start of the engine. Thus, the determination regarding the failure of the hydraulic pressure sensor is made at a stage before an excessive increase of the pulley hydraulic pressure which could happen in process of start of the engine.

In the control apparatus according to the fourth aspect of the invention, it is determined whether the hydraulic pressure sensor has become ready to detect the pulley hydraulic pressure, depending on whether at least the third given length of time has elapsed from a point of time at which the supply of the electric power to at least the hydraulic pressure sensor is initiated. Thus, it is possible to appropriately make the determination as to whether a failure occurs in the hydraulic pressure sensor, until the given length of time elapses from the point of time at which the hydraulic pressure sensor becomes ready to detect the pulley hydraulic pressure, and to appropriately stop making the determination as to whether a failure occurs in the hydraulic pressure sensor, after the given length of time elapses.

In the control apparatus according to the fifth aspect of the invention, it is possible to prevent an erroneous determination of a failure of the hydraulic pressure sensor and appropriately determine the occurrence of a failure of the hydraulic pressure sensor such as the above-described "high-side failure" in a vehicle having the drive-force transmitting apparatus that defines (i) the first drive-force transmitting path through which the drive force is to be transmitted by the gear mechanism when the first drive-force transmitting path is established by engagement of the first engagement device and (ii) the second drive-force transmitting path through which the drive force is to be transmitted by the continuously-variable transmission mechanism when the second drive-force transmitting path is established by engagement of the second engagement device.

DETAILED DESCRIPTION OF PREFERRED EMBODIMENT

Figure 1:
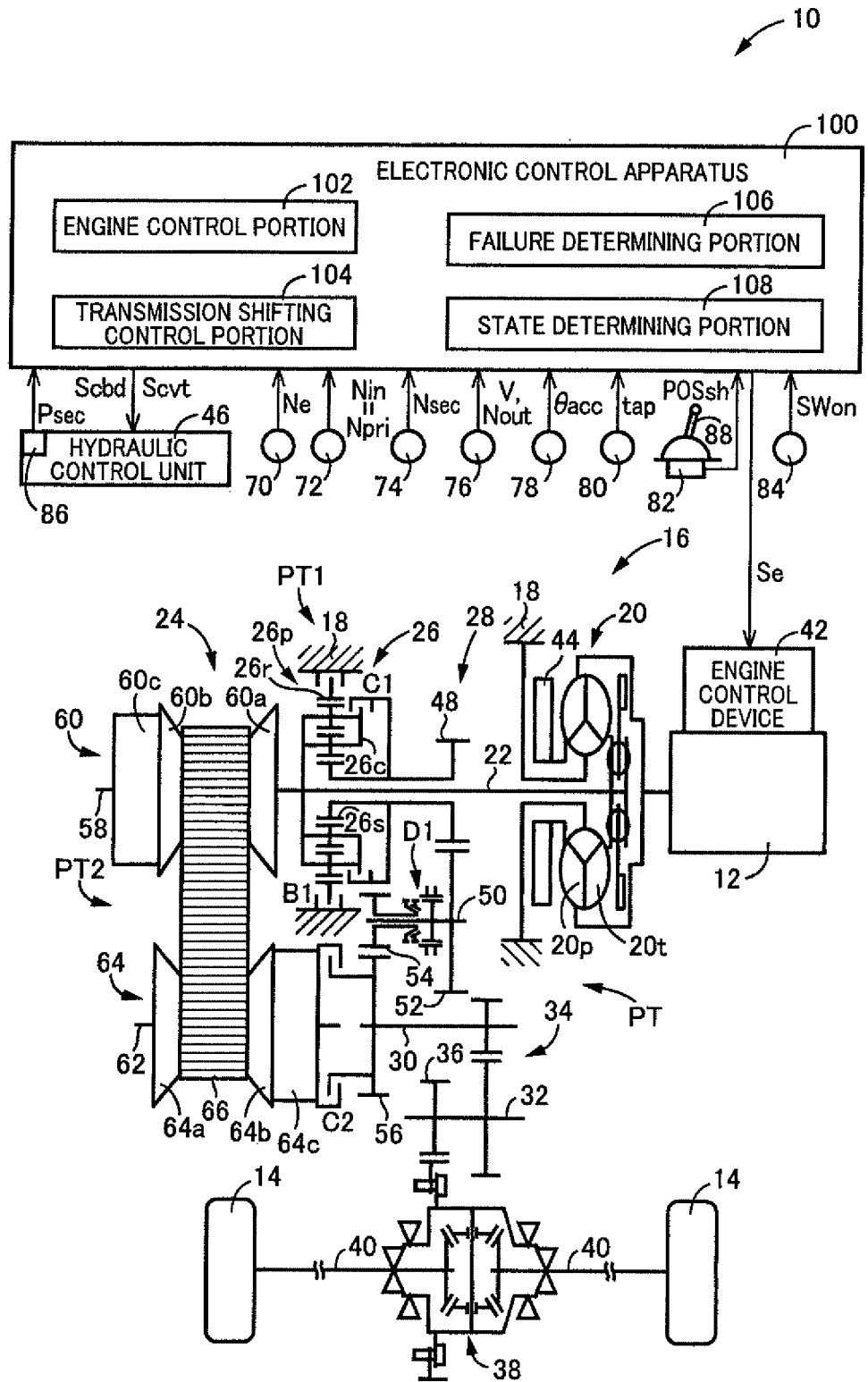
FIG. 1 is a schematic view showing a construction of a vehicle to be controlled by a control apparatus according to the present invention, and major control functions and control portions of the control apparatus.

In the embodiment of the present invention, each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. The vehicle includes a hydraulic control unit configured to control pulley hydraulic pressures, each of which serves as a pressurized working fluid that is to be supplied to the hydraulic actuator of a corresponding one of the primary and secondary pulleys, independently of each other. The hydraulic control unit may be configured to control a rate of flow of the working fluid supplied to the hydraulic actuator, for example, so as to consequently generate the pulley hydraulic pressures, for example. A shifting control operation is performed by the hydraulic control unit to execute a shifting action to establish a target gear ratio while preventing slippage of the transfer element in the continuously-variable transmission mechanism, by controlling the thrust (=pulley hydraulic pressure pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

Further, the term "gear ratio" is defined as "rotational speed of input-side rotary member/rotational speed of output-side rotary member". For example, the gear ratio of the above-described continuously-variable transmission is defined as "rotational speed of the primary pulley/rotational speed of the secondary pulley", and the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. For example, a highest gear ratio can be expressed also as a lowest-speed gear ratio.

The above-described engine is, for example, an internal combustion engine such as a gasoline engine and a diesel engine generating a drive force by combustion of fuel supplied thereto. The vehicle may be equipped with, in addition to the engine, another drive force source in the form of, for example, an electric motor.

Hereinafter, a preferred embodiment of the invention will be described in detail with reference to the accompanying drawings.

EMBODIMENT

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 through a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path through which the drive force of the engine 12 is to be transmitted from the input shaft 22 toward the drive wheels 14 by the gear mechanism 28. The second drive-force transmitting path PT2 is a path through which the drive force of the engine 12 is to be transmitted from the input shaft 22 toward the drive wheels 14 by the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as an engagement device, is provided in the first drive-force transmitting path PT1 and configured to selectively connect and disconnect the first drive-force transmitting path PT1, such that the first drive-force transmitting path PT1 is established with engagement of the first clutch C1 for forward running of the vehicle 10. The first brake B1, which serves as another engagement device, is provided in the first drive-force transmitting path PT1 and configured to selectively connect and disconnect the first drive-force transmitting path PT1, such that the first drive-force transmitting path PT1 is established with engagement of the first brake B1 for reverse running of the vehicle 10. That is, the first drive-force transmitting path PT1 is established with either the first clutch C1 or the first brake B1 being engaged. The second clutch C2, which serves as still another engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a corresponding one of hydraulic actuators. The first clutch C1 corresponds to a first engagement device that is to be engaged for enabling the vehicle 10 to run in a forward direction. The second clutch C2 corresponds to a second engagement device. The first brake B1 corresponds to another first engagement device that is to be engaged for enabling the vehicle 10 to run in a reverse direction. As described below, each of the first clutch C1 and the first brake B1 constitutes a part of the forward/reverse switching device 26.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 100 (that corresponds to "control apparatus" recited in the appended claims), based on an operation amount θacc of an accelerator pedal that corresponds to a required drive force of the vehicle 10 required by an operator of the vehicle 10, whereby an engine torque Te as an output torque of the engine 12 is controlled.

The torque converter 20 is provided with a pump impeller 20p and a turbine impeller 20t that are connected to the engine 12 and the input shaft 22, respectively. The drive-force transmitting apparatus 16 is provided with a mechanical oil pump 44 connected to the pump impeller 20p. The oil pump 44 is to be driven by the engine 12, to supply a pressurized working fluid as a source pressure to a hydraulic control unit (hydraulic control circuit) 46 provided in the vehicle 10, for performing a shifting control operation in the continuously-variable transmission mechanism 24, generating a belt clamping force in the continuously-variable transmission mechanism 24 and switching an operation state of each of the above-described engagement devices between its engaged state and released state. For example, the oil pump 44 supplies a source pressure serving as a pulley hydraulic pressure in the form of primary and second pressures Ppri, Psec, which will be described later.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 52 which meshes with the small-diameter gear 48 and which is provided to be coaxial with the gear-mechanism counter shaft 50 and unrotatable relative to the gear-mechanism counter shaft 50. The large-diameter gear 52 has a diameter larger than that of the small-diameter gear 48. The gear mechanism 28 further includes an idler gear 54 that is provided to be coaxial with the gear-mechanism counter shaft 50 and rotatable relative to the gear-mechanism counter shaft 50, and an output gear 56 that is provided to be coaxial with the output shaft 30 and unrotatable relative to the output shaft 30. The output gear 56 has a diameter larger than that of the idler gear 54. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 52 and the idler gear 54 so as to selectively connect and disconnect a drive-force transmitting path between the two gears 52, 54. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged. An operation state of the dog clutch D1 is switched by operation of a hydraulic actuator (not shown) that is included in the drive-force transmitting apparatus 16.

The first drive-force transmitting path PT1 is established with both of engagement of the dog clutch D1 and engagement of either one of the first clutch C1 and the first brake B1 which are located to be closer to the input shaft 22 than the dog clutch D1. A forward-running drive-force transmitting path is established by engagement of the first clutch C1, and a reverse-running drive-force transmitting path is established by engagement of the first brake B1. When the first clutch C1 as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
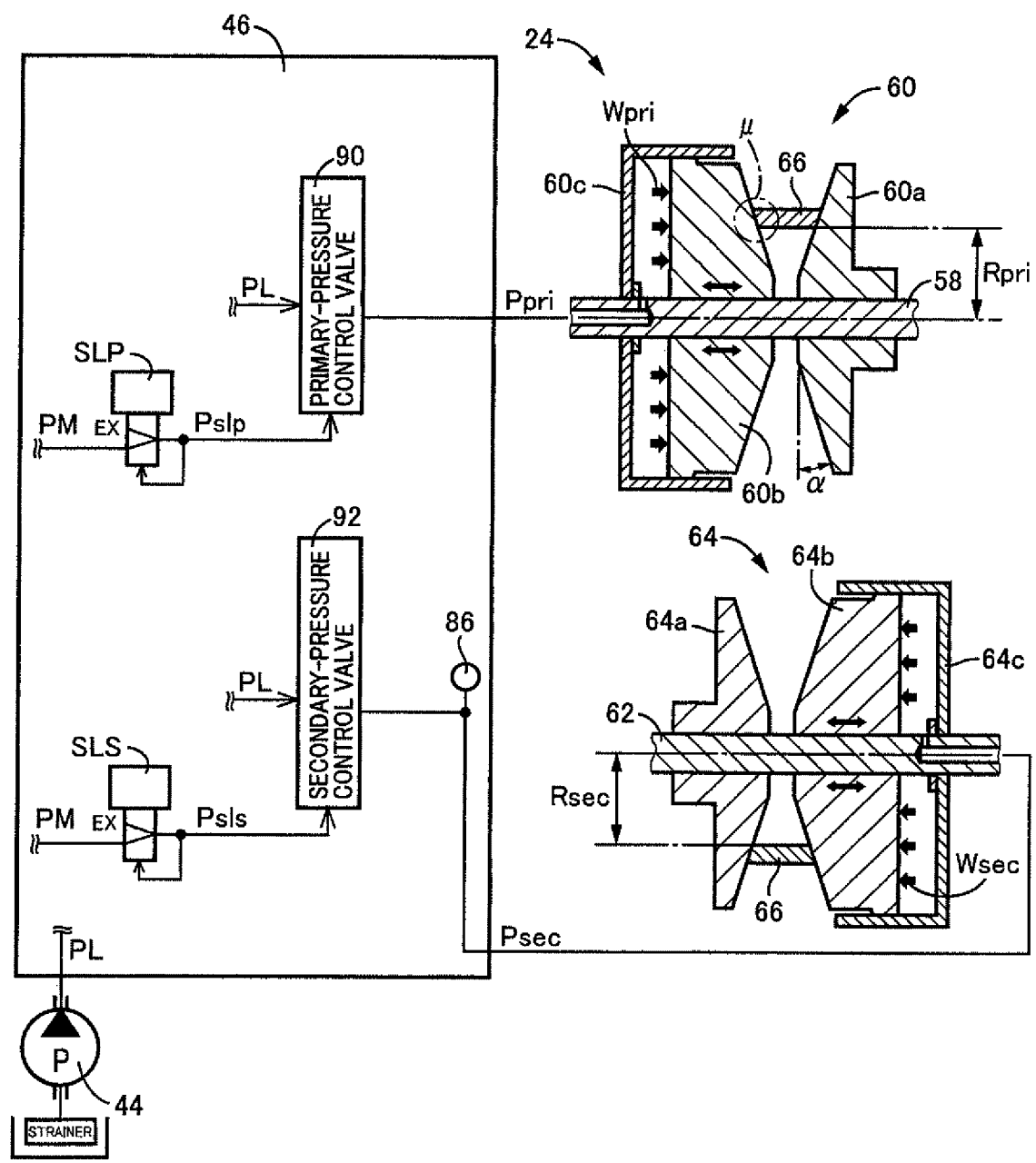
FIG. 2 is a view for explaining a construction of a continuously-variable transmission mechanism and a construction of a hydraulic control unit.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri * pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as the pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wsec to the movable sheave 64b. The secondary thrust Wsec is a thrust (=secondary pressure Psec*pressure receiving area) for changing a width of a V-shaped groove defined between the fixed and movable sheaves 64a, 64b of the secondary pulley 64. That is, the secondary thrust Wsec is a thrust applied to the secondary pulley 64 from the secondary hydraulic actuator 64c, to clamp the transmission belt 66 that is mounted on the secondary pulley 64. The secondary pressure Psec is a hydraulic pressure supplied from the hydraulic control unit 46 to the secondary hydraulic actuator 64c, and serves as the pulley hydraulic pressure for generating the secondary thrust Wsec.

In the continuously-variable transmission mechanism 24, the primary and secondary pressures Ppri, Pout are controlled by the hydraulic control unit 46 that is controlled by the electronic control apparatus 100, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding dimeter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvttgt is established by a combination of the primary thrust Wpri and the secondary thrust Wsec, rather than by only one of the primary thrust Wpri and the secondary thrust Wsec. As described below, the gear ratio γcvt of the continuously-variable transmission mechanism 24 is changed with change of a thrust ratio τ (=Wsec/Wpri) which is a ratio of the secondary thrust Wsec to the primary thrust Wpri and which is dependent on a relationship between the primary pressure Ppri and the secondary pressure Psec. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path section (that constitutes a part of the above-described second drive-force transmitting path PT2) between the secondary pulley 64 and the output shaft 30. The secondary shaft 62 corresponds to "second-engagement-device rotary member" recited in the appended claims. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 runs with the drive force being transmitted through the first drive-force transmitting path PT1 that is established in the drive-force transmitting apparatus 16. The belt running mode is a running mode in which the vehicle 10 runs with the drive force being transmitted through the second drive-force transmitting path PT2 that is established in the drive-force transmitting apparatus 16. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. In the belt running mode, the second clutch C2 is engaged while the first clutch C1 and the first brake B1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds.

The vehicle 10 is provided with the electronic control apparatus 100 as a controller including the control apparatus constructed according to present invention. For example, the electronic control apparatus 100 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 100 is configured to perform, for example, an engine control operation for controlling an output of the engine 12, a shifting control operation and a belt-clamping-force control operation for the continuously-variable transmission mechanism 24, and a hydraulic control operation for switching the operation state of each of the plurality of engagement devices (C1, B1, C2, D1). The electronic control apparatus 100 may be constituted by two or more control units exclusively assigned to perform different control operations such as the engine control operation and the hydraulic control operation.

The electronic control apparatus 100 receives various input signals based on values detected by respective sensors and switch provided in the vehicle 10. Specifically, the electronic control apparatus 100 receives: an output signal of an engine speed sensor 70 indicative of an engine rotational speed Ne which is a rotational speed of the engine 12; an output signal of a primary speed sensor 72 indicative of a primary rotational speed Npri which is a rotational speed of the primary shaft 58 and which is equivalent to an input-shaft rotational speed Nin; an output signal of a secondary speed sensor 74 indicative of a secondary rotational speed Nsec which is a rotational speed of the secondary shaft 62; an output signal of an output speed sensor 76 indicative of an output-shaft rotational speed Nout which is a rotational speed of the output shaft 30 and which corresponds to the running speed V of the vehicle 10; an output signal of an accelerator-operation amount sensor 78 indicative of an accelerator operation amount θacc which represents an amount of accelerating operation made by a vehicle operator; an output signal of a throttle-opening degree sensor 80 indicative of the throttle opening degree tap; an output signal of a shift position sensor 82 indicative of an operation position POSsh of a manually-operated shifting device in the form of a shift lever 88 provided in the vehicle 10; a switch operation signal Swon of a power supply switch 84 (i.e., ignition switch) which represents that the power supply switch 84 has operated by the vehicle operator; and an output signal of a hydraulic pressure sensor 86 indicative of the secondary pressure Psec. Further, the electronic control apparatus 100 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls of operation states of the plurality of engagement devices. It is noted that the input-shaft rotational speed Nin (=primary rotational speed Npri) is equivalent to a rotational speed of the turbine impeller 20*t* of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 100 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 88 is operable to be placed in a selected one of a plurality of operation positions POSsh that consist of, for example, a parking position P, a reverse position R, a neutral position N and a forward drive position D. With the shift lever 88 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 88 being placed in the reverse position R, the drive-force transmitting apparatus 16 is placed in its reverse drive position for enabling the reverse running of the vehicle 10 in the gear running mode. With the shift lever 88 being placed in the neutral position N, the drive-force transmitting apparatus 16 is placed in its neutral position in which the drive-force transmitting apparatus 16 is placed in its neutral state. With the shift lever 88 being placed in the forward drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

As shown in FIG. 2, the hydraulic control unit 46 includes a plurality of solenoid valves SL, a hydraulic pressure sensor 86, a primary-pressure control valve 90 and a secondary-pressure control valve 92. It is noted that FIG. 2 shows principally a part of the hydraulic control unit 46, which is involved in control of the continuously-variable transmission mechanism 24.

Each of the plurality of solenoid valves SL is subjected to an electric-current control executed by the electronic control apparatus 100, so as to regulate a hydraulic pressure and output the regulated hydraulic pressure, by using the working fluid supplied from the oil pump 44. The plurality of solenoid valves SL include a primary solenoid valve SLP and a secondary solenoid valve SLS. The primary solenoid valve SLP receives a modulator pressure PM as a source pressure, and outputs a SLP pressure Pslp that is used to control the primary pressure Ppri as a hydraulic pressure supplied to the hydraulic actuator 60*c* of the primary pulley 60. That is, the primary solenoid valve SLP regulates the primary pressure Ppri by which the primary pulley 60 is to be operated. The secondary solenoid valve SLS receives the modulator pressure PM as a source pressure, and outputs a SLS pressure Psls that is used to control the secondary pressure Psec as a hydraulic pressure supplied to the hydraulic actuator 64*c* of the secondary pulley 64. That is, the secondary solenoid valve SLS regulates the secondary pressure Psec by which the secondary pulley 64 is to be operated.

The hydraulic control unit 46 further includes a primary regulator valve (not shown) to which a hydraulic pressure is supplied as a source pressure from the oil pump 44. The hydraulic pressure supplied to the primary regulator valve is regulated, by the primary regulator valve, to a pressure value dependent on a degree of an engine load that is represented by, for example, the throttle opening degree tap. The thus regulated hydraulic pressure is supplied as a line pressure PL to a modulator valve (not shown) that is also included in the hydraulic control unit 46. The line pressure PL as a source pressure is regulated by the modulator valve to a certain pressure value, and is supplied as the modulator pressure PM to the primary solenoid valve SLP and the secondary solenoid valve SLS.

The primary-pressure control valve 90 receives the line pressure PL as a source pressure, and is operated based on the SLP pressure Pslp so as to regulate the primary pressure Ppri. The secondary-pressure control valve 92 receives the line pressure PL as a source pressure, and is operated based on the SLS pressure Psls so as to regulate the secondary pressure Psec. The hydraulic pressure sensor 86 is configured to detect an actual value of the secondary pressure Psec, i.e., the secondary pressure Psec that has been regulated by the secondary-pressure control valve 92.

The power supply switch 84 is disposed near an operator's seat in the vehicle 10, and is a momentary-type press button switch that is to be operated by the vehicle operator to switch a state of the power supply of the vehicle 10 (hereinafter simply referred to as "vehicle power supply state"). In the present embodiment, the switch operation signal Swon is outputted only when the press button switch as the power supply switch 84 is being operatively pressed, namely, only when the power supply switch 84 is being operated.

The vehicle power supply state is categorized mainly into an ON state in the form of an ignition-on state (hereinafter referred to as "IGON state") that enables the vehicle 10 to run with a combination meter being turned on, a partial ON state in the form of an accessory-on state (hereinafter referred to as "ACC state") that disables the vehicle 10 to run with the combination meter being tuned off and enables a part of functions which is not involved in running of the vehicle 10, and an OFF state that disables the vehicle 10 to run and disables also the part of functions which is not involved in running of the vehicle 10. The vehicle power supply state is switched by the electronic control apparatus 100, depending on the operation position POSsh of the shift lever 88, the switch operation signal Swon and presence or absence of a wheel brake operation.

The IGON state is a state in which the engine 12 can be started during an operation stopped state of the engine 12, and an operated state of the engine 12 can be maintained during the operated state of the engine 12. Further, the IGON state is a state in which the engine 12 can be started in response to switching of the vehicle power supply state to the IGON state during the operation stopped state of the engine 12. Moreover, in the IGON state, an electric power is supplied to the hydraulic pressure sensor 86 and other sensors or the like which are involved in running of the vehicle 10 so that the output signals can be outputted from the sensors or the like.

For performing various control operations in the vehicle 10, the electronic control apparatus 100 includes an engine control means or portion in the form of an engine control portion 102 and a transmission shifting control means or portion in the form of a transmission shifting control portion 104.

The engine control portion 102 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 102 sets a target engine torque Tet that ensures the required drive force Fdem, and outputs the engine-control command signal Se for controlling the engine 12 so as to obtain the target engine torque Tet. The outputted engine-control command signal Se is supplied to the engine control device 42.

During the operation stopped state of the engine 12, when the vehicle power supply state is switched from the OFF state to the IGON state in response to the switch operation signal SWon inputted to the electronic control apparatus 100, with the operation position POSsh of the shift lever 88 being the parking position P or the neutral position N and the wheel brake operation being present, a starter relay is switched to an ON state when a certain delayed time elapsed from a point of time at which the vehicle power supply state is switched to the IGON state. With the starter relay being switched to the ON state, the engine 12 is cranked by a starter (not shown). When the engine rotational speed Ne has been increased by cranking, the engine control portion 102 causes the engine 12 to be started by supplying a fuel and igniting the supplied fuel.

When the operation position POSsh of the shift lever 88 is the parking position P or the neutral position N during stop of the vehicle 10, the transmission shifting control portion 104 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission shifting control portion 104 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission shifting control portion 104 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission shifting control portion 104 executes a switching control operation for switching the running mode between the gear running mode and the belt running mode. Specifically, the transmission shifting control portion 104 determines whether shifting from one of first and second speed positions to the other is to be executed or not, by applying the running speed V and the accelerator operation amount θacc to a stepped shifting map in which shift-up lines, shift-down lines and hysteresis between each of the shift-up lines and a corresponding one of the shift-down lines are defined. The first speed position corresponds to the above-described gear ratio EL provided in the gear mechanism 28 by which the drive force is to be transmitted through the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted through the second drive-force transmitting path PT2 during the belt running mode. Then, when determining that the shifting is to be executed, the transmission shifting control portion 104 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission shifting control portion 104 supplies, to the hydraulic control unit 46, the hydraulic-control command signal Scbd requesting releasing and engaging actions of the respective first and second clutches C1, C2, so as to perform a so-called "clutch to clutch" shifting operation. As a result of the shifting up from the first speed position to the second speed position, the second drive-force transmitting path PT2 is established in place of the first drive-force transmitting path PT1 in the drive-force transmitting apparatus 16. Thus, the transmission shifting control portion 104 executes a stepped shifting control to release and engage the first and second clutches C1, C2, respectively, so as to cause the drive-force transmitting apparatus 16 to execute the shift-up action by which the selected running mode (i.e., selected state) is switched from the gear running mode (i.e., first state) in which the first drive-force transmitting path PT1 is established to the belt running mode (i.e., second state) in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as "stepped shift-up action".

When determining that the running mode is to be switched from the belt running mode to the gear running mode so as to execute the shifting down from the second speed position to the first speed position during running in the belt running mode, the transmission shifting control portion 104 supplies, to the hydraulic control unit 46, the hydraulic-control command signal Scbd requesting releasing and engaging actions of the respective second and first clutches C2, C1, so as to perform the clutch to clutch shifting operation. As a result of the shifting down from the second speed position to the first speed position, the first drive-force transmitting path PT1 is established in place of the second drive-force transmitting path PT2 in the drive-force transmitting apparatus 16. Thus, the transmission shifting control portion 104 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as "stepped shift-down action".

In the switching control operation for switching the running mode between the gear running mode and the belt running mode, the switching between the first and second drive-force transmitting paths PT1, PT2 is made by only the above-described clutch to clutch shifting operation for making a torque transfer via an transition state in which the dog clutch D1 is engaged in the belt running mode in the middle speed range, so that the switching control operation is performed with a shifting shock being restrained.

For executing a shifting action in the continuously-variable transmission mechanism 24 during the belt running mode, the transmission shifting control portion 104 supplies, to the hydraulic control unit 46, the hydraulic-control command signal Scvt for controlling the primary pressure Ppri and the secondary pressure Psec such that the target gear ratio γcvttgt is established in the continuously-variable transmission mechanism 24 while the belt slippage is not caused in the continuously-variable transmission mechanism 24.

Specifically, the transmission shifting control portion 104 calculates the target primary rotational speed Nprit by applying the accelerator operation amount Oacc and the vehicle running speed V into a predetermined relationship in the form of a CVT shifting map. Then, the transmission shifting control portion 104 calculates the target gear ratio γcvttgt (=Nprit/Nsec) based on the target primary rotational speed Nprit. Further, the transmission-shifting control portion 104 calculates an estimated value of the engine torque Te, for example, by applying the throttle opening degree tap and the engine rotational speed Ne to a predetermined relationship such as an engine torque map. Then, the transmission-shifting control portion 104 calculates a turbine torque Tt, based on the estimated value of the engine torque Te and a predetermined relationship such as characteristic of the torque converter 20. The transmission-shifting control portion 104 handles or regards the turbine torque Tt as a primary input torque Tpri that is an input torque inputted to the primary pulley 60. The primary input torque Tpri is a torque that is to act on the primary shaft 58. The transmission shifting control portion 104 calculates a thrust ratio τ for establishing a target gear ratio γcvtt, by applying the target gear ratio γcvtt and a torque ratio to a predetermined relationship such as a thrust ratio map, wherein the torque ratio is a ratio (=Tpri/Tprilim) of the calculated primary input torque Tpri to a predetermined limit torque Tprilim that can be inputted to the primary pulley 60. The transmission shifting control portion 104 calculates a target primary thrust Wprit and a target secondary thrust Wsect that cooperate with each other to establish the thrust ratio τ. In this instance, if one of the target primary thrust Wprit and the target secondary thrust Wsect is determined, the other can be determined based on the thrust ratio τ that establishes the target gear ratio γcvtt. The transmission shifting control portion 104 converts the target primary thrust Wprit and the target secondary thrust Wsect into a target primary pressure Pprit (=Wprit/pressure receiving area) and a target secondary pressure Psect (=Wsect/pressure receiving area), respectively. The transmission shifting control portion 104 supplies, to the hydraulic control unit 46, the hydraulic-control command signal Scvt by which the primary pressure Ppri and the secondary pressure Psec is controlled to the target primary pressure Pprit and the target secondary pressure Psect, respectively. The hydraulic control unit 46 regulates the primary pressure Ppri and the secondary pressure Psec, by operating solenoid valves in accordance with the hydraulic-control command signal Scvt. In the above description relating to the shifting control of the continuously-variable transmission mechanism 24, the thrusts, which are required for enabling the gear ratio γcvt to be held at the target gear ratio γcvtt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvtt.

In calculation of each of the target primary thrust Wprit and the target secondary thrust Wsect, a required thrust, which is minimally required to prevent the belt slippage in the continuously-variable transmission mechanism 24, is taken into consideration. This required thrust is a belt-slip limit thrust that is a thrust value shortly before occurrence of the belt slippage in the continuously-variable transmission mechanism 24.

The transmission shifting control portion 104 sets a primary limit thrust Wprilim that is the limit thrust for the primary pulley 60 and a secondary limit thrust Wseclim that is the limit thrust for the secondary pulley 64. The transmission shifting control portion 104 sets the primary limit thrust Wprilim by using equation (1) given below, and sets the secondary limit thrust Wseclim by using equation (2) given below. In the equations (1) and (2), "α" represents a sheave angle of the pulleys 60, 64, "μ" represents a coefficient of friction generating between the sheave and the element of the belt, "Rpri" represents ½ of the belt winding diameter (effective diameter) of the primary pulley 60, which is calculated based on the gear ratio γcvt of the continuously-variable transmission mechanism 24, "γcvt Tpri" represents a torque inputted to the secondary pulley 64, and "Rsec" represents ½ of the belt winding diameter (effective diameter) of the secondary pulley 64, which is calculated based on the gear ratio γcvt of the continuously-variable transmission mechanism 24 (see FIG. 2). It is noted that the sheave angle α is an angle defined between a conical surface of each of the pulleys 60, 64 and a plane perpendicular to an axis of a corresponding one of the pulleys 60, 64 (see FIG. 2).

$$\text{Wprilim}=(\text{Tpr}*\cos\alpha)/(2*\mu*\text{Rpri}) \tag{1}$$

$$\text{Wseclim}=(\gamma\text{cvt}*\text{Tpri}*\cos\alpha)/(2*\mu*\text{Rsec}) \tag{2}$$

The transmission shifting control portion 104 calculates a secondary shifting-control thrust Wsecsh (=τ*Wprilim) as a thrust that is required to be applied to the secondary pulley 64 for the shift control, based on the primary limit thrust Wprilim and the thrust ratio τ that is required to establish the target gear ratio γcvtt. The transmission shifting control portion 104 sets, as a target secondary thrust Wsect, a larger one of the secondary limit thrust Wseclim and the secondary shifting-control thrust Wsecsh. The transmission shifting control portion 104 calculates the target primary thrust Wprit (=Wsect/τ), based on the target secondary thrust Wsect and the thrust ratio τ that is required to establish the target gear ratio γcvtt.

The continuously-variable transmission mechanism 24 needs to be controlled to a certain state not only in a belt-running-mode situation in which the vehicle 10 is running in the belt running mode, but also in other situations other than the belt-running-mode situation. To this end, it is preferable to establish the target gear ratio γcvttgt of the continuously-variable transmission mechanism 24 while preventing a belt slippage in the continuously-variable transmission mechanism 24, not only in the belt-running-mode situation but also in the other situations. Thus, also in the other situations other than the belt-running-mode situation, as in the belt-running-mode situation, the transmission shifting control portion 104 calculates the target primary thrust Wprit and the target secondary thrust Wsect, and outputs the hydraulic control command signal Scvt for controlling the primary pressure Ppri and the secondary pressure Psec such that the target primary pressure Pprit and target secondary pressure Psect corresponding to the calculated target primary thrust Wprit and target secondary thrust Wsect are assured. The outputted hydraulic control command signal Scvt is supplied to the hydraulic control unit 46. In the belt-running-mode situation in which the second clutch C2 is fully engaged, the turbine torque Tt is used as the primary input torque Tpri that is used in the calculations of the target primary thrust Wprit and the target secondary thrust Wsect. In the other situations other than the belt-running-mode situation, the primary input torque Tpri is set to a torque value that is dependent on the operation state of the second clutch C2.

The hydraulic actuator 64c of the secondary pulley 64 is not yet filled with the working fluid shortly after start of the engine 12, namely, shortly after start of supply of the working fluid to the hydraulic control unit 46 from the oil pump 44. The electronic control apparatus 100 determines whether the hydraulic actuator 64c is filled with the working fluid, by comparing a detected value of the secondary pressure Psec detected by the hydraulic pressure sensor 86, with the target secondary pressure Psect as a command value of the secondary pressure Psec. In a situation in which the hydraulic actuator 64c is not filled with the working fluid, the belt torque capacity Tcvt is not sufficiently available and accordingly there is a risk of the belt slippage. The situation in which the hydraulic actuator 64c is not filled with the working fluid, means that the working fluid is not sufficiently supplied from the oil pump 44 to the hydraulic control unit 46. Therefore, while it is determined by the electronic control apparatus 100 that the hydraulic actuator 64c is not yet filled with the working fluid, the transmission shifting control portion 104 does not output the hydraulic control command signal Scbd for causing the above-described engagement devices (C1, B1, C2, D1) to be engaged. That is, the engagement of each of the engagement devices is delayed until the hydraulic actuator 64c is filled sufficiently with the working fluid. Since the detected value of the secondary pressure Psec detected by the hydraulic pressure sensor 86 reflects an actual value of the secondary pressure Psec, the detected value of the secondary pressure Psec will be referred to as "actual secondary pressure Psec" in the following description regarding the present embodiment.

To correctly make a determination as to whether the hydraulic actuator 64c is filled with the working fluid, there is a condition that the hydraulic pressure sensor 86 works without failure. In other words, when a failure occurs in the hydraulic pressure sensor 86, it is not possible to correctly determine whether or not the hydraulic actuator 64c is filled with the working fluid. Therefore, in the event of a failure occurring occurs in the hydraulic pressure sensor 86, the electronic control apparatus 100 does not make the determination using the actual secondary pressure Psec. When a failure occurs in the hydraulic pressure sensor 86, the electronic control apparatus 100 establishes a failure mode in which it is determined that filling of the hydraulic actuator 64c with the working fluid is completed after a sufficient length of time, i.e., a predetermined filling time has elapsed from a point of time of initiation of start of the engine 12, and then, upon determination that the filling is completed, allows an output of the hydraulic control command signal Scbd for causing the above-described engagement devices to be engaged by the transmission shifting control portion 104.

By the way, during increase of the engine rotational speed Ne in process of start of the engine 12, the supply of the working fluid from the oil pump 44 could become unstable, so that there is a case in which the actual secondary pressure Psec is made excessively higher than the target secondary pressure Psect. That is, in process of start of the engine 12, there is a case in which a surge pressure is generated in the hydraulic actuator 64c. On the other hand, the electronic control apparatus 100 is likely to determine that a failure occurs in the hydraulic pressure sensor 86 when the actual secondary pressure Psec is excessively higher than the target secondary pressure Psect and is higher than a threshold pressure value for the failure determination. In such a case, if the surge pressure is generated in the hydraulic actuator 64c, there is a risk that it could be erroneously determined by the electronic control apparatus 100 that a failure occurs in the hydraulic pressure sensor 86. When determining that a failure occurs in the hydraulic pressure sensor 86, the electronic control apparatus 100 cannot make the determination (as to whether the hydraulic actuator 64c is filled with the working fluid) using the actual secondary pressure Psec, and establishes the above-describe failure mode. Thus, the determination of completion of the filling of the hydraulic actuator 64c with the working fluid is delayed by the erroneous determination of a failure of the hydraulic pressure sensor 86, whereby the engagement of each of the engagement devices could be delayed. In the vehicle 10, the first drive-force transmitting path PT1 is established as a result of execution of an engaging action of the first clutch C1 or the first brake B1 after completion of engagement of the dog clutch D1, so that the drivability could be reduced by increase of a length of time from start of the engine 12 until generation of the drive force, which increase is caused by the above-described erroneous determination. For example, start of running of the vehicle 10 could be delayed unnecessarily. It is therefore preferable to avoid delay of allowance for engagement of each of the engagement devices, which delay could be caused by the above-described erroneous determination that a failure occurs in the hydraulic pressure sensor 86. It is also preferable to reliably determine occurrence of a so-called "high-side failure" of the hydraulic pressure sensor 86 that increases the actual secondary pressure Psec to a maximum value.

The electronic control apparatus 100 makes a determination as to whether a failure occurs in the hydraulic pressure sensor 86, only in a given length of time from a point of time at which the hydraulic pressure sensor 86 becomes ready to detect the actual secondary pressure Psec by initiation of supply of the electric power to the hydraulic pressure sensor 86 as a result of placement of the vehicle power supply state into the IGON state, at the latest until a point of time shortly before the surge pressure could be generated in the hydraulic actuator 64c in process of start of the engine 12.

Specifically, the electronic control apparatus 100 further includes a failure determining means or portion in the form of a failure determining portion 106 and a state determining means or portion in the form of a state determining portion 108, for making the determination as to whether a failure occurs in the hydraulic pressure sensor 86, only in the above-described given length of time.

The failure determining portion 106 makes the determination as to whether a failure occurs in the hydraulic pressure sensor 86, until a given length A of time as a first given length of time elapses from a point of time at which the hydraulic pressure sensor 86 becomes ready to detect the actual secondary pressure Psec by supply of the electric power to the hydraulic pressure sensor 86 after placement of the vehicle power supply state into the IGON state during an operation stopped state of the engine 12, such that the determination is made based on the actual secondary pressure Psec obtained by the hydraulic pressure sensor 86. Further, the failure determining portion 106 does not make the determination as to whether a failure occurs in the hydraulic pressure sensor 86, after the given length A of time elapses from the above-described point of time. That is, the failure determining portion 106 makes the determination as to whether a failure occurs in the hydraulic pressure sensor 86, only in a period of time until the given length A of time elapses from the point of time at which the hydraulic pressure sensor 86 becomes ready to detect the actual secondary pressure Psec after the placement of the vehicle power supply state into the IGON state (namely, after initiation of supply of an electric power to at least the hydraulic pressure sensor 86) during the operation stopped state of the engine 12.

The failure determining portion 106 makes the determination as to whether a failure occurs in the hydraulic pressure sensor 86, depending on whether a certain state has been kept for at least a given length B of time as a second given length of time, wherein the certain state is a state in which the actual secondary pressure Psec is higher than a given pressure value and the actual secondary pressure Psec is higher than the target secondary pressure Psect by a value larger than a given pressure value difference.

The above-described given pressure value is, for example, a value close to the actual secondary pressure Psec when the above-described "high-side failure" occurs in the hydraulic pressure sensor 86, and is a predetermined threshold upper limit value that is determined such that the actual secondary pressure Psec becomes certainly higher than the predetermined threshold upper limit value as the given pressure value when the "high-side failure" occurs in the hydraulic pressure sensor 86. The above-described given pressure value difference is, for example, a predetermined threshold lower limit value that is required to make it possible to determine that the actual secondary pressure Psec is deviated from the target secondary pressure Psect by a degree that enables a determination that a failure occurs in the hydraulic pressure sensor 86. That is, the above-described given pressure value is an absolute amount that is used to make the determination as to whether a failure occurs in the hydraulic pressure sensor 86, while the above-described pressure value difference is a deviation amount that is used to make the determination as to whether a failure occurs in the hydraulic pressure sensor 86.

The given length A of time is not larger than a length of time, for example, from the point of time at which the hydraulic pressure sensor 86 becomes ready to detect the actual secondary pressure Psec until the point of time at which the actual secondary pressure Psec is likely to be increased substantially to the above-described given pressure value as a result of increase of the engine rotational speed Ne in process of start of the engine 12. The given length A of time corresponds to a predetermined period of time in which the above-described determination regarding a failure of the hydraulic pressure sensor 86 is made. The given length B of time is, for example, a predetermined length of time that is required to make it possible to determine that the actual secondary pressure Psec is kept abnormally high for such a large length of time that enables a reliable determination that a failure occurs in the hydraulic pressure sensor 86.

The state determining portion 108 makes a determination as to whether the hydraulic pressure sensor 86 has become ready to detect the actual secondary pressure Psec, depending on whether at least a given length C of time as a third given length of time has elapsed from the point of time at which the vehicle power supply state had been switched to the IGON state, namely, at which the supply of the electric power to at least the hydraulic pressure sensor 86 is initiated. In this instance, the state determining portion 108 makes a determination as to whether the given length C of time has elapsed from the point of time at which the vehicle power supply state had been switched to the IGON state, based on a hydraulic-pressure-sensor power-supply counter that is counted up during supply of the electric power to the hydraulic pressure sensor 86. That is, the state determining portion 108 determines that the given length C of time has elapsed from the above-described point of time, when the power-supply counter indicates a value not smaller than the given length C of time. The state determining portion 108 sets a hydraulic-pressure-sensor power-supply-completion determination flag to ON, when determining that the given length C of time has elapsed from the above-described point of time. The given length C of time is, for example, a predetermined length of time that is required to complete the power supply to the hydraulic pressure sensor 86 to cause the hydraulic pressure sensor 86 become ready to reliably detect the actual secondary pressure Psec after start of supply of the electric power to the hydraulic pressure sensor 86.

The failure determining portion 106 makes a determination as to whether all of first, second and third conditions have been kept satisfied for at least a given length B of time as a second given length of time. When all of the first through third conditions have been satisfied for at least the given length B of time, the failure determining portion 106 determines that a failure occurs in the hydraulic pressure sensor 86, and set a hydraulic-pressure-sensor failure determination flag to ON.

The above-described first condition is a condition that the actual secondary pressure Psec as the detected value of the secondary pressure Psec detected by the hydraulic pressure sensor 86 is higher than the above-described given pressure value. That is, the first condition is a condition [1] that is expressed by "actual secondary pressure Psec>given pressure value". The above-described second condition is a condition that the actual secondary pressure Psec is higher than the target secondary pressure Psect as the command value of the secondary pressure Psec by at least the above-described given pressure value difference. That is, the second condition is a condition [2] that is expressed by "actual secondary pressure Psec—target secondary pressure Psect>given pressure value difference" The above-described third condition is a condition that at least the given length A of time has not elapsed from the point of time at which the hydraulic pressure sensor 86 had become ready to detect the actual secondary pressure Psec. That is, the third condition is a condition [3] that is expressed by "within the given length A of time after the hydraulic-pressure-sensor power-supply-completion determination flag is set to ON".

The state determining portion 108 makes a determination as to whether the vehicle power supply state is in the OFF state. When determining that the vehicle power supply state is in the OFF state, the state determining portion 108 sets the hydraulic-pressure-sensor power-supply-completion determination flag to OFF. When it is determined by the state determining portion 108 that the power supply state is in the OFF state, the failure determining portion 106 sets the hydraulic-pressure-sensor failure determination flag to OFF.

Figure 3:
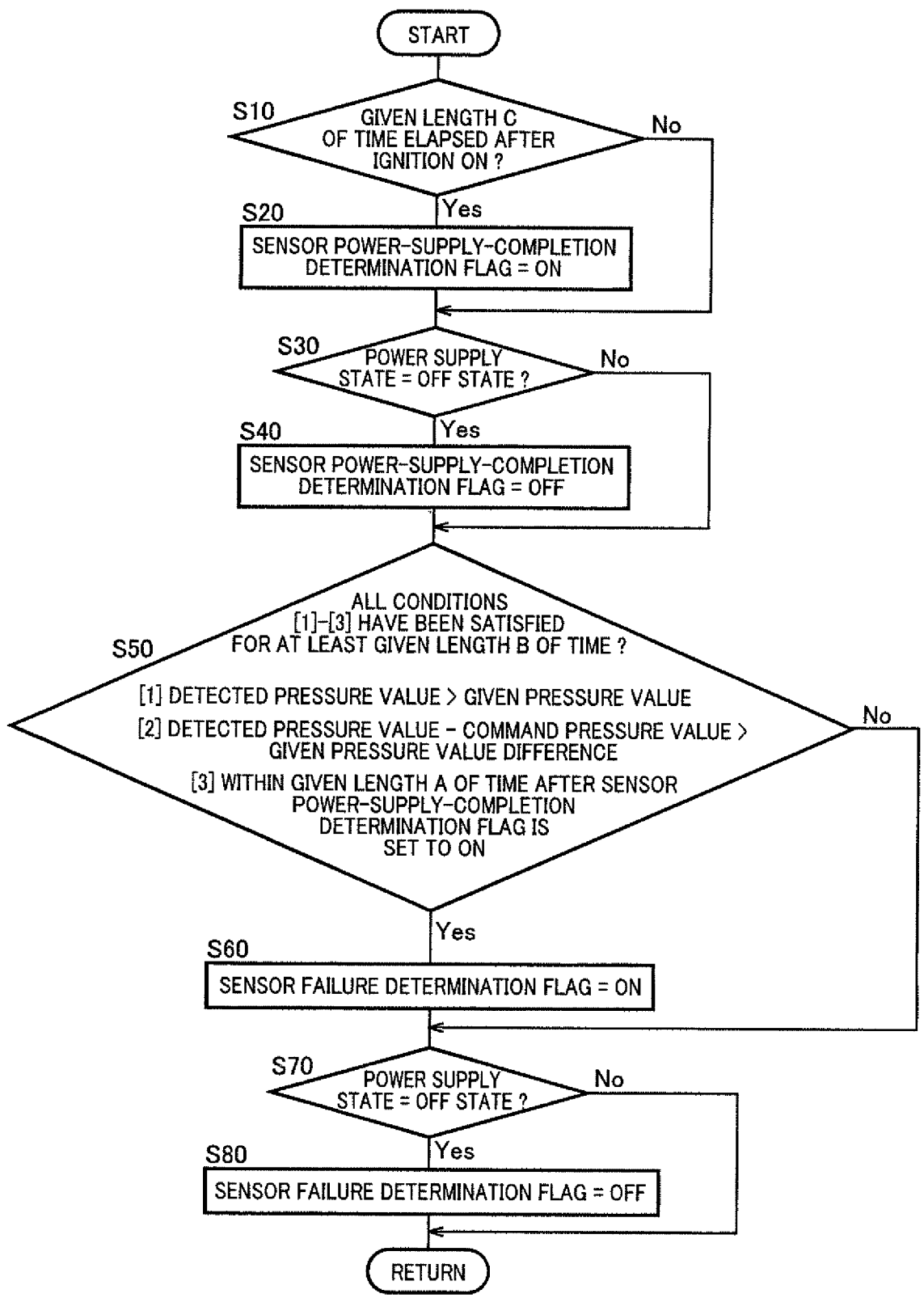
FIG. 3 is a flow chart showing a main part of a control routine executed by the control apparatus, namely, a control routine that is executed for preventing an erroneous determination of a failure of a hydraulic pressure sensor and appropriately determining the occurrence of a so-called "high-side failure" of the hydraulic pressure sensor.
Figure 4:
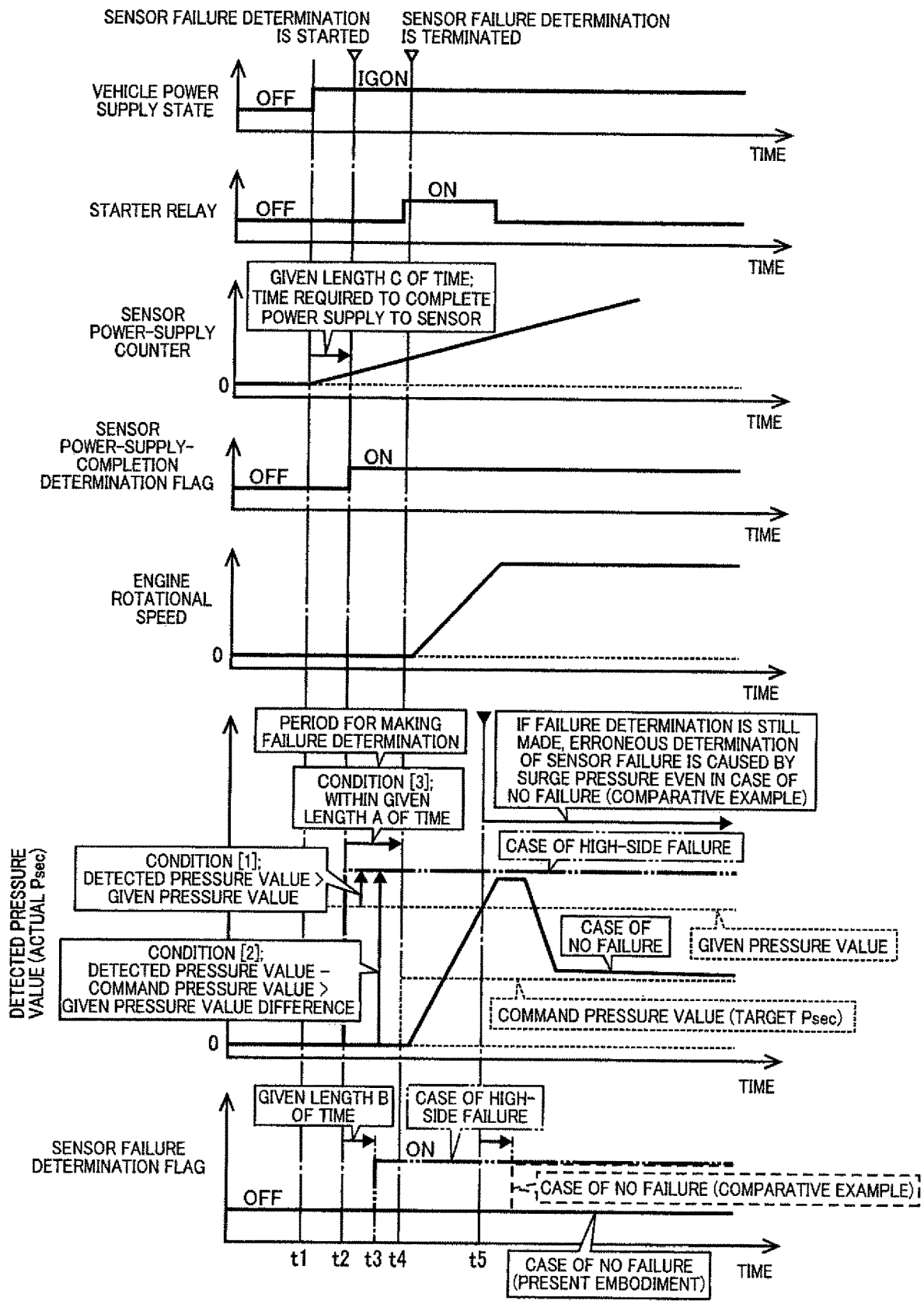
FIG. 4 is a time chart for explaining, by way of example, a case where the control routine of FIG. 3 is executed.

FIG. 3 is a flow chart showing a main part of a control routine executed by the electronic control apparatus 100, namely, a control routine that is executed for preventing the erroneous determination of a failure of the hydraulic pressure sensor 86 and appropriately determining the occurrence of the above-described "high-side failure" of the hydraulic pressure sensor 86. This control routine is executed repeatedly each time the vehicle power supply state is switched to the IGON state. FIG. 4 is a time chart for explaining, by way of example, a case where the control routine of FIG. 3 is executed.

As shown in FIG. 3, the control routine is initiated with step S10 corresponding to function of the state determining portion 108, which is implemented to determine whether the hydraulic pressure sensor 86 has become ready to detect the actual secondary pressure Psec, depending on whether the given length C of time has elapsed from the point of time at which the vehicle power supply state had been switched to the IGON state. When an affirmative determination is made at step S10, step S20 corresponding to function of the state determining portion 108 is implemented to set the hydraulic-pressure-sensor power-supply-completion determination flag to ON. When a negative determination is made at step S10, or after implementation of step S20, the control flow goes to step S30 corresponding to function of the state determining portion 108, which is implemented to determine whether the vehicle power supply state is in the OFF state. When an affirmative determination is made at step S30, step S40 corresponding to function of the state determining portion 108 is implemented to set the hydraulic-pressure-sensor power-supply-completion determination flag to OFF. When a negative determination is made at step S30, or after implementation of step S40, the control flow goes to step S50 corresponding to function of the failure determining portion 106, which is implemented to determine whether all of the above-described conditions [1], [2], [3] have been satisfied for at least the given length B of time. When an affirmative determination is made at step S50, step S60 corresponding to function of the failure determining portion 106 is implemented to set the hydraulic-pressure-sensor failure determination flag to ON. When a negative determination is made at step S50 or after implementation of step S60, the control flow goes to step S70 corresponding to function of the state determining portion 108, which is implemented to determine whether the vehicle power supply state is in the OFF state. When a negative determination is made at step S70, one cycle of execution of the control routine is terminated. When an affirmative determination is made at step S70, step S80 corresponding to function of the failure determining portion 106 is implemented to set the hydraulic-pressure-sensor failure determination flag to OFF. It is noted that an electric power starts to be supplied when the vehicle power supply state is switched to the IGON state. Further, the above-described determination flags are stored, for example, in a non-volatile memory or the like that is provided in the electronic control apparatus 100. Further, although the supply of the electric power to the electronic control apparatus 100 is cut off when the vehicle power supply state is switched to the OFF state, the cutting-off of the supply of the electric power is made after update of each of the above-described determination flags. Or alternatively, when the vehicle power supply state is switched to the OFF state, an electric voltage applied to the electronic control apparatus 100 may be slowly lowered by function of a condenser or the like, so that the above-described determination flags can be stored in the non-volatile memory or the like for a while shortly after the vehicle power supply state is switched to the OFF state.

FIG. 4 shows, by way of example, a case in which the engine 12 is started in response to switching of the vehicle power supply state to the IGON state during the operation stopped state of the engine 12. In FIG. 4, a point t1 of time indicates a point of time at which the vehicle power supply state is changed from the OFF state to the IGON state and at the same time the hydraulic-pressure-sensor power-supply counter starts to be counted up (see a stage after the point t1 of time). A point t2 of time indicates a point of time at which the hydraulic-pressure-sensor power-supply counter has been counted up to a value corresponding to the given length C of time and at the same time the hydraulic-pressure-sensor power-supply-completion determination flag is set to ON. With the hydraulic-pressure-sensor power-supply-completion determination flag being set to ON, the determination as to whether a failure occurs in the hydraulic pressure sensor 86 is started. This determination is made during a limited period having the given length A of time (see a stage from the point t2 of time to a point t4 of time). If the above-described "high-side failure" occurs in the hydraulic pressure sensor 86, as indicated two-dot chain line, it is determined that a failure occurs in the hydraulic pressure sensor 86 when any of the above-described conditions [1], [2], [3] has been satisfied for at least the given length B of time. A point t3 of time indicates a point of time at which at least the given length B of time has elapsed from the satisfaction of any of the conditions [1], [2], [3] and at the same time it is determined that a failure occurs in the hydraulic pressure sensor 86 whereby the hydraulic-pressure-sensor failure determination flag is set to ON. On the other hand, when the certain delayed time has elapsed from the point t1 of time (at which the vehicle power supply state is switched from the OFF state to the IGON state), the starter relay is placed in the ON state whereby an operation for starting the engine 12 is initiated shortly after the point t4 of time at which making the above-described determination is ceased or stopped. When the surge pressure is generated in the hydraulic actuator 64c in process of start of the engine 12, if the determination as to whether a failure occurs in the hydraulic pressure sensor 86 were still made upon and after the generation of the surge pressure, it would be erroneously determined that a failure occurs in the hydraulic pressure sensor 86, due to the generation of the surge pressure, as indicated by broken line representing a comparative example in FIG. 4 (see a stage after a point t5 of time), even though no failure actually occurs in the hydraulic pressure sensor 86. In the present embodiment, the determination as to whether a failure occurs in the hydraulic pressure sensor 86 is made during the limited period having the given length A of time, so that it is possible to prevent the above-described erroneous determination even if the surge pressure is generated, when no failure actually no occurs in the hydraulic pressure sensor 86, as indicated by solid line representing the present embodiment in FIG. 4 (see a stage after a point t5 of time). Although the above-described determination is made exclusively during the limited period having the given length A of time, an occurrence of the above-described "high-side failure" of the hydraulic pressure sensor 86 can be appropriately detected or determined.

As described above, in the present embodiment, it is determined whether a failure occurs in the hydraulic pressure sensor 86, based on the actual secondary pressure Psec that is the detected value detected by the hydraulic pressure sensor 86, until the given length A of time elapses from the point of time at which the hydraulic pressure sensor 86 becomes ready to detect the actual secondary pressure Psec after the vehicle power supply state is switched to the IGON in the operation stopped state of the engine 12. Thus, the determination regarding the failure of the hydraulic pressure sensor 86 is made at a stage before an excessive increase of the actual secondary pressure Psec which could happen in process of start of the engine 12, for example, when the engine 12 is started upon the initiation of the supply of the electric power to at least the hydraulic pressure sensor 86. Owing to this arrangement, it is possible to detect or determine the occurrence of a failure of the hydraulic pressure sensor 86 such as a so-called "high-side failure" which is caused by, for example, a short circuit and which increases the detected value of the actual secondary pressure Psec to a maximum value. On the other hand, it is not determined whether a failure occurs in the hydraulic pressure sensor 86, after the given length A of time elapses from the point of time at which the hydraulic pressure sensor 86 becomes ready to detect the actual secondary pressure Psec. Thus, when an excessive increase of the actual secondary pressure Psec happens in process of start of the engine 12, it is not erroneously determined that a failure occurs in the hydraulic pressure sensor 86. Therefore, it is possible to prevent an erroneous determination of a failure of the hydraulic pressure sensor 86 and appropriately determine the occurrence of the "high-side failure" of the hydraulic pressure sensor 86. Further, a required length of time until generation of the drive force after start of the engine 12, is prevented from being increased by the erroneous determination. Thus, it is also possible to prevent delay in start of running of the vehicle 10, for example.

In the present embodiment, it is determined that a failure occurs in the hydraulic pressure sensor 86 when all of the above-described three conditions, i.e., conditions [1], [2], [3] are kept satisfied for at least the given length B of time, so that a failure of the hydraulic pressure sensor 86 such as the above-described "high-side failure" is appropriately detected or determined.

In the present embodiment, the above-described given length A of time is not larger than a length of time, from the point of time at which the hydraulic pressure sensor becomes ready to detect the actual secondary pressure Psec, until the point of time at which the actual secondary pressure Psec is likely to be increased substantially to the above-described given pressure value as a result of increase of the engine rotational speed Ne in process of start of the engine 12. Thus, the determination regarding the failure of the hydraulic pressure sensor 86 is made at a stage before an excessive increase of the actual secondary pressure Psec which could happen in process of start of the engine 12.

In the present embodiment, it is determined whether the hydraulic pressure sensor 86 has become ready to detect the actual secondary pressure Psec, depending on whether at least the given length C of time has elapsed from the point of time at which the supply of the electric power to at least the hydraulic pressure sensor 86 is initiated. Thus, it is possible to appropriately make the determination as to whether a failure occurs in the hydraulic pressure sensor 86, until the given length A of time elapses from the point of time at which the hydraulic pressure sensor 86 becomes ready to detect the actual secondary pressure Psec, and to appropriately stop making the determination as to whether a failure occurs in the hydraulic pressure sensor 86, after the given length A of time elapses.

While the preferred embodiment of this invention has been described in detail by reference to the drawings, it is to be understood that the invention may be otherwise embodied.

For example, in the above-described embodiment, the engine 12 is started in response to placement of the vehicle power supply state into the IGON state. However, the control routine of FIG. 3 may be executed also where the placement of the vehicle power supply state into the IGON state does not accompany the start of the engine 12, namely, also where the engine 12 is not started in response to the placement of the vehicle power supply state into the IGON state. Further, where the supply of an electric power to the electronic control apparatus 100, i.e., at least the hydraulic pressure sensor 86, is made to cause the hydraulic pressure sensor 86 to become ready to detect the actual secondary pressure Psec also when the vehicle power supply state is the ACC state, the term "initiation of supply of an electric power to at least the hydraulic pressure sensor", which is recited in the appended claims, may be interpreted to encompass the placement of the vehicle power supply state into the ACC state as well as the placement of the vehicle power supply state into the IGON state. That is, the present invention is applicable also when the vehicle power supply state is placed into the ACC state.

In the above-described embodiment, the present invention is applied to the vehicle 10 having the first and second drive-force transmitting paths PT1, PT2 that are provided in parallel with each other between the input shaft 22 and the output shaft 30, such that the drive force is transmittable by the gear mechanism 28 through the first drive-force transmitting path PT1, and such that the drive force is transmittable by the continuously-variable transmission mechanism 24 through the second drive-force transmitting path PT2. However, the present invention is applicable also to a vehicle having a single drive-force transmitting path provided between the engine as a drive force source and the drive wheels, wherein the drive force is transmittable through the single drive-force transmitting path by a belt-type continuously-variable transmission mechanism such as the continuously-variable transmission mechanism 24. In such a vehicle having the single drive-force transmitting path, for example, the belt-type continuously-variable transmission mechanism is disposed in series with an engagement device in the drive-force transmitting path between the engine and the drive wheels, wherein the engagement device disposed in series with the belt-type continuously-variable transmission mechanism may be a frictional engagement device such as a starting clutch and an input clutch, or may be a frictional engagement device like the first clutch C1 or first brake B1 that are included in the forward/reverse switching device 26. In the vehicle having the single drive-force transmitting path provided with the belt-type continuously-variable transmission mechanism, there is a risk that a belt slippage could occur if the drive force is transmitted from the engine to the belt-type continuously-variable transmission mechanism by engagement of the engagement device when the hydraulic actuator of the secondary pulley is not yet filled with the working fluid. For avoiding such a risk, the engagement of the engagement device is delayed until the hydraulic actuator becomes filled with the working fluid. Further, in the event of a failure occurring in the hydraulic pressure sensor, the failure mode is established as in the above-described embodiment. Therefore, as in the above-described embodiment, due to generation of the surge pressure in process of start of the engine, there is substantially the same object to be achieved also in the vehicle having the single drive-force transmitting path provided with the belt-type continuously-variable transmission mechanism. That is, as in the above-described embodiment, also in this vehicle having the single drive-force transmitting path, substantially the same technical advantages can be obtained with application of the present invention. The present invention is applicable to any vehicle that is provided with the belt-type continuously-variable transmission mechanism.

In the above-described embodiment, the hydraulic pressure sensor 86 configured to detect the secondary pressure Psec corresponds to the "hydraulic pressure sensor configured to detect a pulley hydraulic pressure", which is recited in the recited in the appended claims. However, the "hydraulic pressure sensor configured to detect a pulley hydraulic pressure" may be a hydraulic pressure sensor configured to detect the primary pressure Ppri.

In the above-described embodiment, the second clutch C2 is disposed in the drive-force transmitting path section (that constitutes a part of the second drive-force transmitting path PT2) between the secondary pulley 64 and the output shaft 30. However, this arrangement is not essential. It is possible to employ a modified arrangement in which, for example, the second clutch C2 is disposed in another drive-force transmitting path section (that constitutes another part of the second drive-force transmitting path PT2) between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and/or a gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up lines and shift-down lines are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as a fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided. Moreover, the dog clutch D1, which is provided in the first drive-force transmitting path PT1 (through which the drive force is to be transmitted by the gear mechanism 28) in the above-described embodiment, does not have to be necessarily provided, for carrying out the present invention.

In the above-described embodiment, the power supply switch 84 is the momentary-type press button switch. However, the power supply switch 84 may be a rotary switch that is to be operated to place the vehicle power supply state to one of the OFF state, the ACC state, the IGON state and the engine start state.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
14: drive wheels
16: vehicle drive-force transmitting apparatus
22: input shaft (input rotary member)
24: continuously-variable transmission mechanism
28: gear mechanism
30: output shaft (output rotary member)
44: oil pump
60: primary pulley
64: secondary pulley
66: transmission belt (transfer element)
86: hydraulic pressure sensor
100: electronic control apparatus (control apparatus)
106: failure determining portion
108: state determining portion
B1: first brake (first engagement device)
C1: first clutch (first engagement device)
C2: second clutch (second engagement device)
PT1: first drive-force transmitting path
PT2: second drive-force transmitting path

What is claimed is:

1. A control apparatus for a vehicle that includes an engine, drive wheels, a drive-force transmitting apparatus, a hydraulic pressure sensor and a pump,
   wherein the drive-force transmitting apparatus is configured to transmit a drive force of the engine toward the drive wheels, and includes a continuously-variable transmission mechanism including a primary pulley, a secondary pulley and a transfer element looped over the primary and secondary pulleys,
   wherein the hydraulic pressure sensor is configured to detect a pulley hydraulic pressure by which the primary pulley or the secondary pulley is to be operated, wherein the pump is to be driven by rotation of the engine so as to supply the pulley hydraulic pressure, wherein said control apparatus includes a failure determining portion configured to make a determination as to whether a failure occurs in the hydraulic pressure sensor, based on a detected value of the pulley hydraulic pressure detected by the hydraulic pressure sensor, wherein said failure determining portion is configured to make said determination until a given length of time elapses from a point of time at which the hydraulic pressure sensor becomes ready to detect the pulley hydraulic pressure after initiation of supply of an electric power to at least the hydraulic pressure sensor in an operation stopped state of the engine, and wherein said failure determining portion is configured to not make said determination after said given length of time elapses from said point of time.

2. The control apparatus according to claim 1, wherein said failure determining portion is configured to determine that the failure occurs in the hydraulic pressure sensor when all of three conditions are kept satisfied for at least a second given length of time, and wherein said three conditions consist of a first condition that the detected value of the pulley hydraulic pressure is higher than a given pressure value, a second condition that the detected value of the pulley hydraulic pressure is higher than a command value of the pulley hydraulic pressure by a value larger than a given pressure value difference, and a third condition that a length of time that is not larger than said given length of time as a first given length of time has elapsed from said point of time.

3. The control apparatus according to claim 1, wherein the supply of the electric power to at least the hydraulic pressure sensor is initiated in the operation stopped state of the engine, by turning on an ignition switch of the vehicle whereby the engine becomes ready to be started in response to the ignition switch turned on, and wherein said given length of time is not larger than a length of time, from said point of time, until a point of time at which the pulley hydraulic pressure is increased, as a result of increase of a rotational speed of the engine in process of start of the engine, substantially to a given pressure value that is used to determine whether the failure occurs in the hydraulic pressure sensor.

4. The control apparatus according to claim 1, further comprising a state determining portion configured to determine whether the hydraulic pressure sensor has become ready to detect the pulley hydraulic pressure, wherein said state determining portion determines that the hydraulic pressure sensor has become ready to detect the pulley hydraulic pressure, when at least a third given length of time elapses from a point of time at which the supply of the electric power to at least the hydraulic pressure sensor is initiated.

5. The control apparatus according to claim 1, wherein the drive-force transmitting apparatus further includes: an input rotary member to which the drive force is to be transmitted from the engine; an output rotary member from which the drive force is to be outputted to the drive wheels; a gear mechanism configured to provide at least one gear ratio; a first engagement device; and a second engagement device, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path through which the drive force is to be transmitted by the gear mechanism when the first drive-force transmitting path is established by engagement of the first engagement device, and wherein the plurality of drive-force transmitting paths include a second drive-force transmitting path through which the drive force is to be transmitted by the continuously-variable transmission mechanism when the second drive-force transmitting path is established by engagement of the second engagement device.

6. The control apparatus according to claim 1, wherein said given length of time is shorter than a length of time from said point of time until the engine is started, whereby said failure determining portion is configured to stop making said determination before the engine is started and to not make said determination after the engine is started.

* * * * *